Sept. 8, 1970  R. H. LAPP ET AL  3,527,435

ANTENNA SUPPORTING AND POSITIONING DEVICE

Filed March 17, 1969  3 Sheets-Sheet 1

ROGER H. LAPP
ALEXANDER YORINKS
INVENTORS

BY Harvey A. David
John M. Pease

ATTORNEYS

Sept. 8, 1970  R. H. LAPP ET AL  3,527,435
ANTENNA SUPPORTING AND POSITIONING DEVICE
Filed March 17, 1969  3 Sheets-Sheet 2

ROGER H. LAPP
ALEXANDER YORINKS
INVENTORS
ATTORNEYS

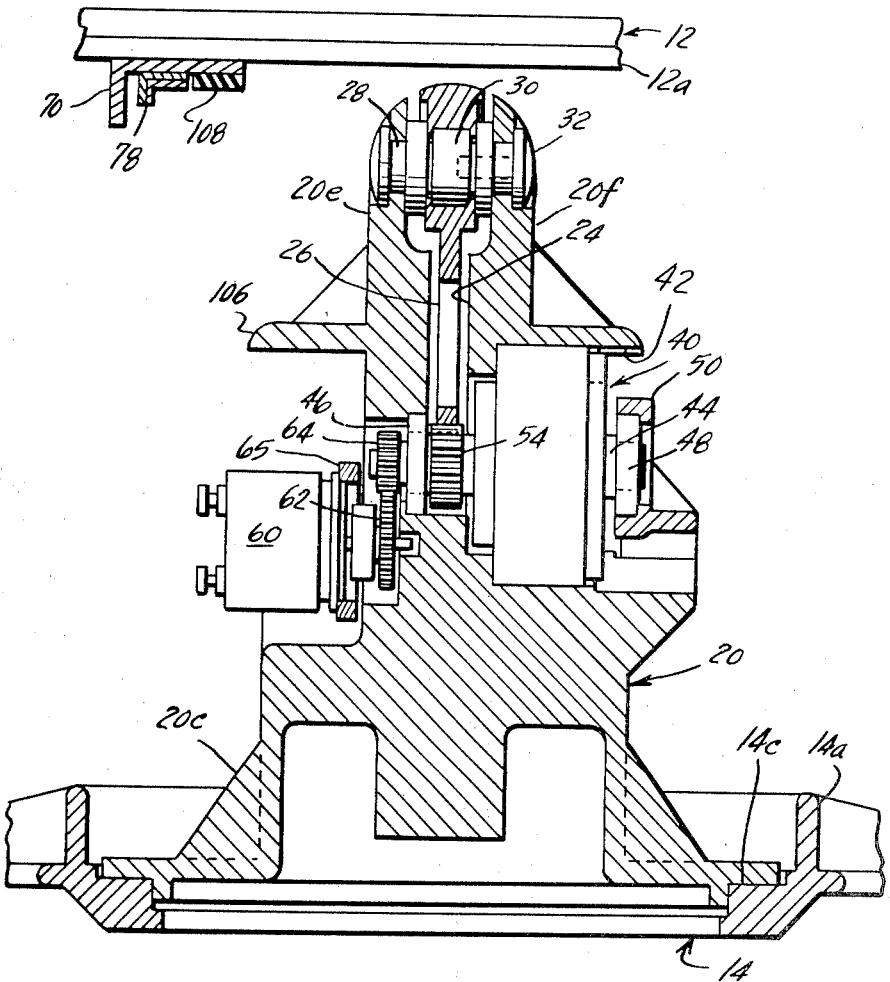
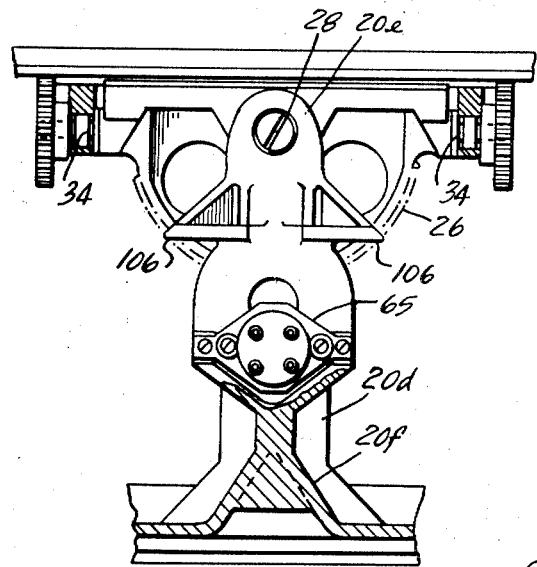

United States Patent Office 3,527,435
Patented Sept. 8, 1970

3,527,435
ANTENNA SUPPORTING AND POSITIONING
DEVICE
Roger H. Lapp, Silver Spring, Md., and Alexander
Yorkins, New Hyde Park, N.Y.; said Lapp assignor, by
mesne assignments, to the United States of America as
represented by the Secretary of the Navy
Filed Mar. 17, 1969, Ser. No. 807,692
Int. Cl. F16m 11/12
U.S. Cl. 248—184
9 Claims

ABSTRACT OF THE DISCLOSURE

An improved antenna supporting and positioning device is disclosed having a mass balanced member rotatable about first and second axes intersecting normal to one another, the positioning being effected about one axis by a first torque motor driven pinion gear meshing with a mass balanced gear sector to which is fixed shafting defining the other axis, positioning about that other axis being effected by two additional motors mounted on the member and connected through planetary gearing to the shafting, whereby operation of the two additional motors effects rotation thereof and of the member.

BACKGROUND OF THE INVENTION

Certain guided missiles employ a radar system including an antenna which is moved by an antenna supporting and positioning device in a search pattern until the desired target is acquired, after which the positioning device keeps the antenna aimed at the target in spite of variations of the missile from a line of sight course to the target, the antenna displacement from the flight axis of the missile being utilized to correct the missile flight path to one which will bring the missile to the target. In order to achieve a high degree of accuracy in positioning of the antenna especially while undergoing the varying accelerations characteristic of such missile flights, it is desirable that the antenna positioning means have low moments of inertia, coupled with adequate balance of parts and efficient coupling of motor means with the moving parts.

Heretofore the antenna positioning means, or seeker heads as they are sometimes referred to, have utilized a variety of drive means and support structures for moving an antenna about a plurality of axes lying in planes normal to one another. These have included push-rods, ball joints, universal joints, links, levers, and an assortment of bearing styles in combinations thereof. Many combinations include the attachment of rotary members to translatory members which appear balanced to environmental acceleration and vibration in several planes but not all planes, and the amount of imbalance shifts with increased look angle. They have occupied more space than is desirable and have been subject to excess weight, high inertia, imbalance, and high friction within the drive means thereby deprecating the missile performance. Moreover, the prior art devices have been inordinately expensive to manufacture in view of their intended one-time use in a missile, and have been somewhat deficient in ease of maintainability during periods prior to use.

BRIEF SUMMARY OF THE INVENTION

With the foregoing in mind, it is a primary object of the present invention to provide an improved two-axis seeker head, the construction of which will permit significant reductions in production costs as well as substantial improvements in reliability and maintainability.

As another object this invention aims to provide a two-axis seeker head of the foregoing character and which is unusually compact, precision balanced, and exhibits high rigidity during dynamic maneuver accelerations accompanied by substantial $g$-forces.

Still another object of the invention is the provision of a two-axis seeker head which is characterized by a simplified design incorporating a minimum of bearings to accomplish all rotational features, thereby increasing reliability, reducing dynamic friction and breakaway torque so as to give unusually fast response to angular changes of motion.

Yet another object is the provision of a seeker head which is readily adapted to a third degree of freedom, i.e., rotation about a central axis.

It is an object of this invention to provide a device where structural members an ancillary equipment provide the required mechanical stiffness while their combined center of gravity is so located as not to require counterweights, where the mass of such counterweights penalizes the performance of the missile.

Still another object is to provide high torsional stiffness in the servos to realize high frequency response.

It is taught here that for the servo follow-up systems within gimbal mechanisms to be immune to the effects of severe external environmental accelerations, all parts of the gimbal mechanism which rotate about either the first or the second axis must be mass balanced about the intersection of these axes both individually and in combination. It will be readily apparent to those skilled in the art that achieving this within the structural needs of the design, without taking a performance penalty in the form of additional non-structural counterweight members, is truly advancing the art.

BRIEF DESCRIPTION OF THE DRAWINGS

The invention may be further said to reside in certain constructions and arrangements of parts by which the foregoing objects and advantages are achieved, as well as others which will become apparent from the following description of a presently preferred embodiment when read in conjunction with the accompanying sheets of drawings forming a part of this specification, and in which:

FIG. 3 is a fragmentary sectional view taken substantially along line 3—3 of FIG. 2;

FIG. 4 is a fragmentary view, partly in elevation and partly in section, of the device viewed from the side opposite that of FIG. 2.

DESCRIPTION OF THE PREFERRED EMBODIMENT

Figure 1:
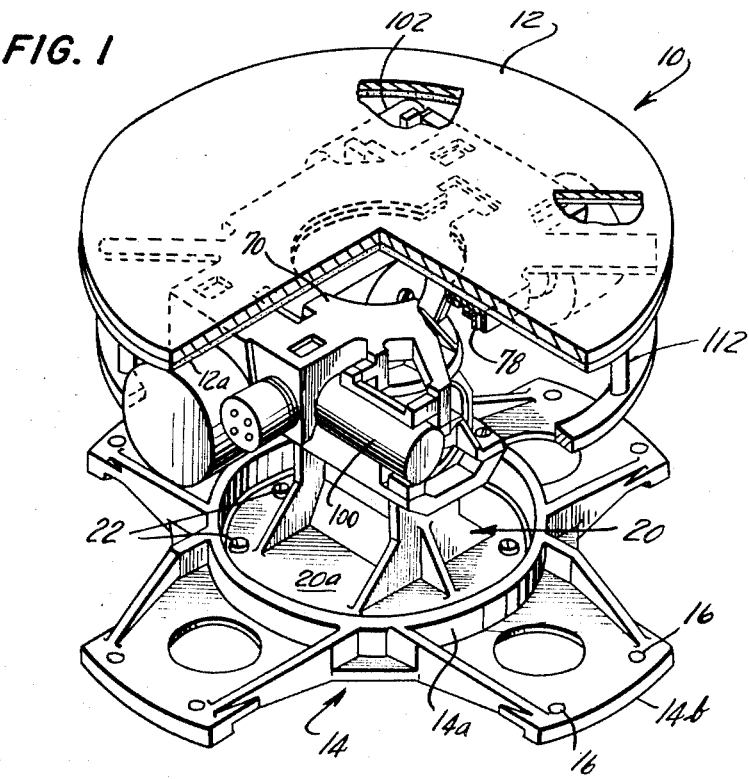
FIG. 1 is a perspective view of a two-axis seeker head device embodying the present invention, with some portions broken away to reveal other portions.

In the form of the invention illustrated in the drawings and described hereinafter, there is provided an antenna supporting and positioning device, generally indicated at 10 in FIG. 1, an antenna 12 including a backing element 12a being shown in association therewith. The device 10 comprises a base 14 which is conveniently formed as a casting of a suitable light weight metal. The base 14 includes an annular wall portion 14a from which extend four radial leg portions 14b having apertures 16 in the distal ends thereof. The apertures 16 serve to accommodate bolts or other fasteners for securing the device 10 within a missile radome.

An annular shoulder 14c extends inwardly from the wall portion 14a of the base, as is best shown in FIG. 3, and has mounted thereon a central post or support member 20 which is also conveniently formed as a casting, but preferably of steel. The central support member 20 comprises an outwardly extending annular flange 20a at one end thereof which is secured in mated engagement with the shoulder 14c of the base. Fasteners such as screws 22 secure the central support member 20 to the base 14.

The central support member 20 includes a generally A shaped portion 20b adjacent the flange 20a, when viewed as illustrated in FIG. 4, the structure being made rigid by a plurality of vertical webs or buttresses such as 20c and 20d. This construction affords a very light weight, yet strong and rigid support for the elements yet to be described.

Reverting to FIG. 3, the end of the central support member 20 which is remote from the base 14 is bifurcated to form two portions 20e and 20f, separated by a stepped slot 24 which is wider at the entrance thereof and which accommodates a sector gear 26.

The sector gear 26 is mounted for rotation in the slot 24 by means of a pivot pin 28 which extends through aligned openings in the end portions 20e and 20f of the central support member 20, as well as through a suitable anti-friction bearing 30 disposed in a bore through the sector gear. The pivot pin 28 is headed at one end and is retained by a headed screw 32 threaded into the other end, which screw abuts the end of the pivot pin so as to prevent drawing together of the end portions 20e, 20f of the central support member 20.

Figure 5:
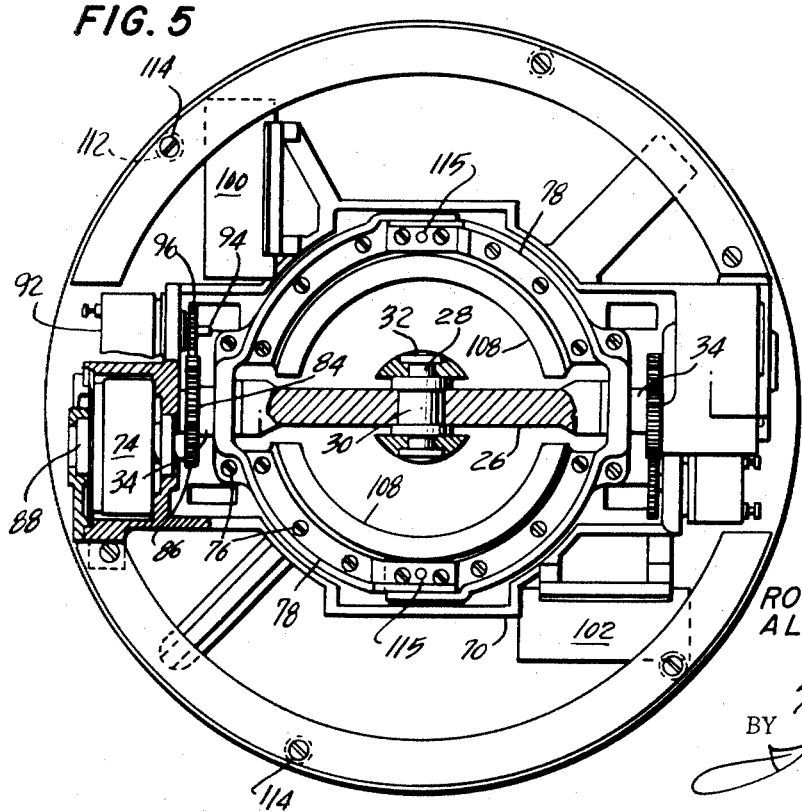
FIG. 5 is a sectional view taken substantially along line 5—5 of FIG. 2.
Figure 2:
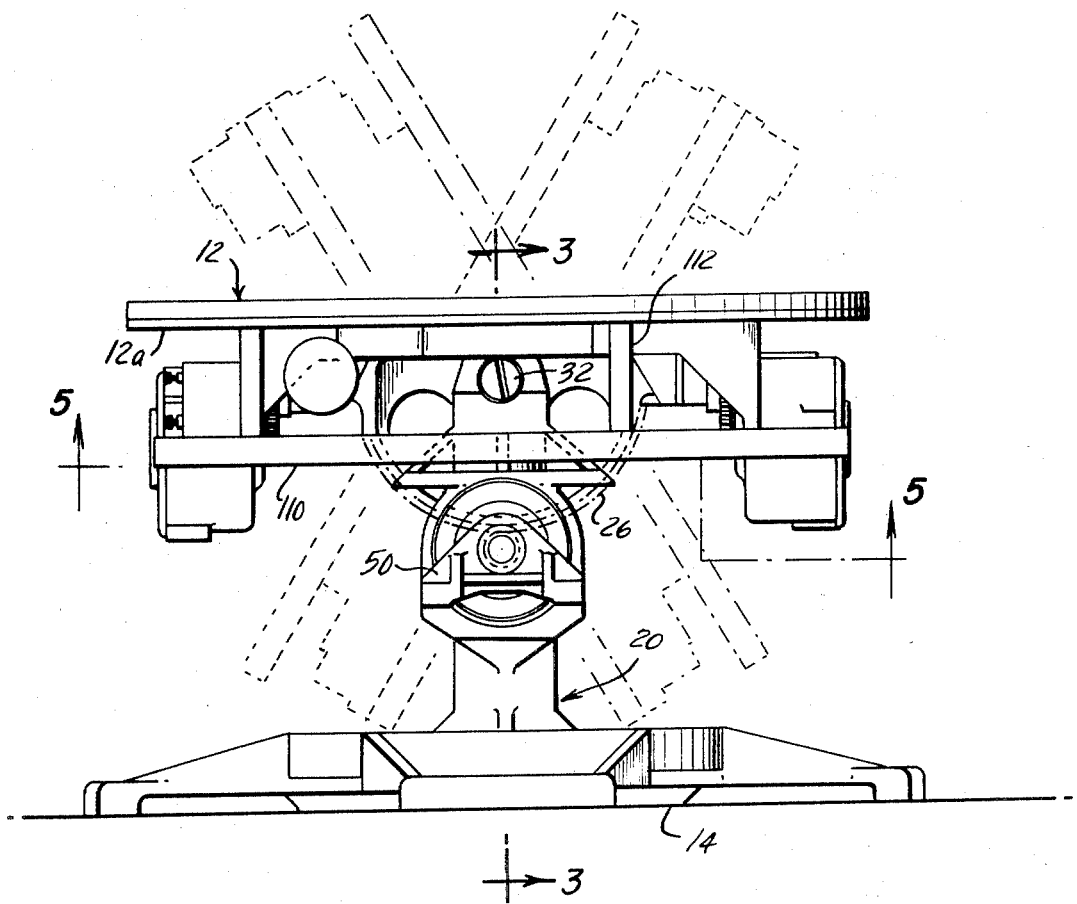
FIG. 2 is a side elevational view of the device of FIG. 1.

The pivot pin 28 defines a first axis about which the antenna 12 may be positioned, a second axis being defined by a pair of axially aligned stub shafts 34 which are diametrically opposed on sector gear 26, where the first axis and the second axis intersect at 90 degrees as is best illustrated in FIG. 5. The stub shafts 34 may be formed integrally with the sector gear 26, but in any event are fixed with respect thereto.

The sector gear 26 is adapted to be positioned about the pivot pin 28 by an electric motor 40 which is received in a stepped bore 42 extending through the central support member 20. The motor 40 comprises an armature shaft 44 which is supported for rotation, and confined against undue axial movement, by a bearing 46 disposed within the stepped bore 42, and a bearing 48 supported in a bearing block or pillow 50 secured to the central support member 20.

The shaft 44 carries an integral pinion 54 for rotation by the motor and which pinion is in meshing engagement with the sector gear 26. The effective gear ratio between the pinion 54 and sector gear 26 is about 7:1. The sector gear 26 is a high strength member capable of supporting the entire gimballed mass, with perforations appropriately placed to provide its center of gravity at the intersection of the first and second axes of rotation which is contained within the part. The motor 40, which is conveniently of the type sometimes known as a torque motor and preferably embodies the brushless variety as compared to the familiar brush type, forms part of a follow-up system for positioning the antenna 12. The position of the sector gear 26 with respect to the support member 20 is sensed by a potentiometer 60 which is adjustably secured to the central support member 20 by a pillow block 65 and has a shaft to which is fixed a gear 62. The gear 62 is in meshing engagement with a second pinion gear 64 on the shaft 44 of the motor 40.

Referring now to FIG. 5, the antenna 12 is mounted on a cast antenna and motor support member 70 which supports a pair of torque motors 74, the purposes of which will become apparent as the description proceeds. The antenna 12 and the support member 70 are secured by suitable fasteners such as dowels 115 and screws 76 to a pair of semi-circular castings 78. The castings 78 carry suitable anti-friction bearings 80 for rotation on the stub shafts 34.

Clamped or otherwise fixed to the outer end of each stub shaft 34 is a spur gear 84, these gears each being in meshing engagement with a pinion 86 on the shaft 88 of an adjacent one of the torque motors 74. The pinions 86 operate with respect to the spur gears 84 in the relation of planetary gears to sun gears. Thus, excitation of the motors 74 will cause the pinions 86 to revolve about the gears 84, and the motors 74, the castings 78, 70 and antenna 12 to turn as a steerable unit about the axis defined by the stub shafts 34. The just mentioned axis is the second axis about which the antenna may be positioned, the first being that defined by the pivot pin 28.

Movement of the antenna 12 to different positions about the second axis is sensed by a pair of potentiometers 92 which are mounted, along with the motors 74, for movement with the antenna. These potentiometers 92 each comprise a shaft 94 carrying a pinion 96 in meshing engagement with a corresponding one of the spur gears 84 on the stub shafts 34.

The first and second axes defined respectively by the pivot pin 28 and the stub shafts 34 intersect at 90 degrees; said intersection is called the gimbal center. Tilting of the antenna about the second axis may conveniently be referred to as A plane movement, while tilting of the antenna about the first axis may be referred to as B plane movement. Thus, the position of the antenna 12 may be defined with respect to the A and B planes. To this end, there are provided an A plane gyro 100 and a B plane gyro 102 mounted on the casting 70 at right angles to one another. These gyros form part of the guidance system of the missile in which the device 10 is to be used. Device 10 shows two gyros in this embodiment; it should not be construed to limit the number to two since another type of guidance system might employ three gyros similarly mounted.

It will be observed that the use of two relatively small A plane motors 74 mounted for movement with the antenna 12 makes it unnecessary to provide the balance weight which would be required to offset a single A plane motor. Also, the planetary drives between the motors 74 and the stub shafts 34 provide for a desirable torque advantage coupled with the use of the two relatively small motors. In this regard, the torque motors 74 each operate through a gear ratio of 3:1, thereby providing a torque advantage of six times that of an individual one of the motors 74.

Movement of the antenna 12 is confined to a look angle of 56° in this example. This is accomplished by provision of a bumper ring or ring segments 106, which are conveniently formed as part of the central support member casting. The bumper ring segments cooperate with suitable cushion means such as semicircular rubber cushions 108 which are fixed to the casting 70 so as to engage the bumper ring segments when the desired limits of movement are reached.

In instances where a conventional antenna 12 and backing element 12a are employed, the member rotatable about the first axis defined by pivot pin 28 is mass balanced about the gimbal center by propitious deployment of structural elements and ancillary equipment, on the opposite side of the plane containing the two axes of rotation, from the antenna. In the even a heavier antenna is used, the invention contemplates the inclusion of a counterweight ring or ring segments 110 supported from the antenna so as to fall on the opposite side, of the plane containing the two axes of rotation, from the antenna. These segments may be conveniently supported as by spacer posts 112 and screws 114.

In some instances it may be desirable to provide for rotation about a third axis. This may be readily provided for by inserting a large diameter, thin section bearing between the central support member 20 and the shoulder 14c of the base 14. In other instances, where it is known that such a third axis of rotation will not be desired, some further economy of manufacture and of weight may be effected by casting the base 14 and central support member 20 together as an integral unit.

Obviously many modifications and variations of the present invention are possible in the light of the above teachings. It is therefore to be understood that within the scope of the appended claims the invention may be practiced otherwise than as specifically described.

What is claimed is:
1. An antenna supporting and positioning device comprising:
   a base;
   a central support member extending from said base and having a slot defined therein at the distal end from said base;
   a cross member disposed in said slot;
   first pivot means pivotally mounting said cross member to said central post for rotation about a first axis;
   said cross member including second pivot means defining a second axis disposed to intersect said first axis at 90 degrees;
   antenna support means pivotally mounted by said pivot means to said cross member and rotatable about said second axis;
   first drive means mounted on said central support member and operable to effect said rotation of said cross member about said first axis;
   second drive means mounted on said antenna support means and operative to effect rotation of said antenna support means about said second axis; and
   the center of gravity of all mass rotatable about said first axis being at said intersection of said first and second axes for all antenna pointing positions and the center of gravity of all mass rotatable about said second axis being at said intersection of said first and second axes for all antenna pointing positions.
2. An antenna supporting and positioning device as defined in claim 1 and wherein:
   said cross member comprises a sector gear;
   said first drive means comprises first motor means mounted on said central support member and including a shaft extending parallel to said first axis;
   a pinion on said shaft and in meshing engagement with said sector gear whereby excitation of said first motor means causes said cross member to rotate about said pivot means;
   said second pivot means comprising a pair of stub shafts extending in diametrically opposite directions from said sector gear and fixed thereto;
   said second drive means comprising second and third motor means mounted on said antenna support means; and
   gear means connecting said second and third motor means to said stub shafts whereby excitation of said second and third motor means causes said second and third motor means and said antenna support means to turn about said second axis.
3. An antenna supporting and positioning device as defined in claim 2 and wherein:
   said gear means connecting said second and third motor means to said stub shafts comprises planetary gearing.
4. An antenna supporting and positioning device as defined in claim 3 and wherein:
   said second and third motor means each including a shaft disposed parallel to the axis of said stub shafts;
   said planetary gearing comprising first and second spur gears each fixed to one of said stub shafts; and
   a pinion gear fixed to each of said shafts of said second and third motor means and in meshing engagement with one of said spur gears whereby excitation of said second and third motors causes said second and third motors, said antenna support means, and said antenna to turn about said second axis.
5. An antenna supporting and positioning device as defined in claim 3, and wherein:
   said base comprises a casting including an annular wall portion from which four legs portions extend; and
   an annular shoulder extending inwardly from said annular wall portion;
   said central support member comprises an annular flange disposed against said shoulder; and
   fastening means securing said central support member to said base.
6. An antenna supporting and positioning device as defined in claim 3, and further comprising:
   follow-up means including first potentiometer means mounted on said central support member and having a shaft geared to said sector gear.
7. An antenna supporting and positioning device as defined in claim 6, and said follow-up means further including:
   second and third potentiometer means mounted on said antenna support means and each having a shaft geared to one of said stub shafts.
8. An antenna supporting and positioning means as defined in claim 7, and further comprising:
   cushion means fixed to said antenna support means; and
   bumper means on said central support member and cooperative with said cushion means to limit movements of said antenna.
9. An antenna supporting and positioning means as defined in claim 8, and further comprising:
   balance weight means supported from said antenna support means for movement therewith and having its center of mass lying in a plane disposed on the side of said second axis remote from said antenna.

References Cited

UNITED STATES PATENTS

| | | | |
|---|---|---|---|
| 2,648,042 | 8/1953 | Klein et al. | 248—180 |
| 2,719,921 | 10/1955 | Cairnes | 343—882 |
| 2,877,459 | 3/1959 | Brown et al. | 343—882 |
| 3,001,289 | 9/1961 | Carbonara | 33—61 |
| 3,219,304 | 11/1965 | Freer | 248—184 |
| 3,383,081 | 5/1968 | Guttenberg | 248—183 |
| 3,386,694 | 6/1968 | Boyle | 248—179 |
| 3,464,116 | 9/1969 | Kissell | 33—61 |

FOREIGN PATENTS

| | | |
|---|---|---|
| 808,829 | 11/1959 | Great Britain. |
| 1,254,398 | 1/1961 | France. |
| 1,461,193 | 10/1966 | France. |

MARION PARSONS, Jr., Primary Examiner

U.S. Cl. X.R.

343—882